US012585075B2

(12) United States Patent
Bruecher et al.

(10) Patent No.: US 12,585,075 B2
(45) Date of Patent: Mar. 24, 2026

(54) MODULE ASSEMBLY, CARRIER UNIT AND CARRIER ARRANGEMENT FOR THE FIBER-OPTIC DISTRIBUTION INDUSTRY

(71) Applicant: Rosenberger-OSI GmbH & Co. OHG, Augsburg (DE)

(72) Inventors: Luis Bruecher, Berlin (DE); Danny Heimer, Miesbach (DE); Sven Schlomka, Munich (DE); Benjamin Weigand, Augsburg (DE); Harald Mayr, Amerdingen (DE)

(73) Assignee: Rosenberger-OSI GmbH & Co. OHG, Augsburg (DE)

( * ) Notice: Subject to any disclaimer, the term of this patent is extended or adjusted under 35 U.S.C. 154(b) by 0 days.

(21) Appl. No.: 18/377,897

(22) Filed: Oct. 9, 2023

(65) Prior Publication Data

US 2024/0126037 A1 Apr. 18, 2024

(30) Foreign Application Priority Data

Oct. 7, 2022 (EP) .................................... 22200401

(51) Int. Cl.
*G02B 6/00* (2006.01)
*G02B 6/44* (2006.01)

(52) U.S. Cl.
CPC ......... *G02B 6/4453* (2013.01); *G02B 6/4452* (2013.01)

(58) Field of Classification Search
CPC ............... G02B 6/4453; G02B 6/4452; G02B 6/44526; G02B 6/4455; G02B 6/00
See application file for complete search history.

(56) References Cited

U.S. PATENT DOCUMENTS

| | | | |
|---|---|---|---|
| 10,585,258 B2 | 3/2020 | Wentworth | |
| 10,670,822 B2 * | 6/2020 | Vogel ................. | G02B 6/44528 |
| 2018/0020269 A1 | 1/2018 | Smith | |
| 2019/0121046 A1 | 4/2019 | Rolfe | |

FOREIGN PATENT DOCUMENTS

| | | | | |
|---|---|---|---|---|
| CN | 209387933 U | 9/2019 | | |
| DE | 102018106262 A1 | 9/2019 | | |
| EP | 2995981 A2 | 3/2016 | | |
| WO | WO-2015040211 A1 * | 3/2015 | ........... | G02B 6/4439 |

OTHER PUBLICATIONS

European Search Report dated Mar. 24, 2023.
European Office Action dated Sep. 20, 2023.
China Office Action dated Mar. 14, 2025.

* cited by examiner

*Primary Examiner* — Jennifer Doan
(74) *Attorney, Agent, or Firm* — Randall Danskin P.S.

(57) ABSTRACT

A module assembly (1) for fibre-optic distribution, which is mounted along a mounting direction in a slot (11) defined in a carrier unit (2), with a centre region (M) through which a centre axis (A) oriented in the mounting direction (x) runs. Two side regions (S), each of which is positioned opposite the other relative to the centre axis (A) each have a side wall (20.1). At least one of the side walls (20.1) has in certain sections along the centre axis (A), a curvy and/or multi-step profile that changes a distance (d) from the centre axis (A) such that the at least one side wall (20.1) forms at least one protrusion or setback portion (23, 24, SP) for form-fitting mounting a module assembly (1) in the slot (11) defined in the carrier unit (2).

16 Claims, 5 Drawing Sheets

MODULE ASSEMBLY, CARRIER UNIT AND CARRIER ARRANGEMENT FOR THE FIBER-OPTIC DISTRIBUTION INDUSTRY

CROSS-REFERENCE TO RELATED APPLICATIONS

This US National Stage Non-Provisional Patent application claims priority to earlier filed European Patent Application No. 22 200 401.2 which was filed on 7 Oct. 2022. The entire contents of the aforementioned earlier filed European Patent Application is expressly and fully incorporated herein by this reference.

Pursuant to USPTO rules, this priority claim to earlier filed European Patent Application No. 22 200 401.2 which was filed on 7 Oct. 2022 is also included in the Application Data Sheet (ADS) filed herewith.

FIELD OF INVENTION

The invention relates to a module assembly for the fibre-optic distribution industry, which can be mounted along a mounting direction in a slot in a separate carrier unit.

The invention also relates to a carrier unit for the fibre-optic distribution industry, having a carrier plate, which has at least one slot for at least one module assembly.

The invention further relates to a carrier arrangement having a carrier unit and at least one module assembly mounted in a slot defined in a carrier unit.

BACKGROUND OF THE INVENTION

In computing centres, carrier units, in particular individual trays or even "patch panels", are used to produce and distribute data connections, e.g. via network cables, telephone cables or glass fibre cables. In practice, several patch panels are often installed at various vertical levels in a common distribution frame (also referred to as a "rack").

Such a patch panel generally comprises at least one interface having a certain number of terminals or plug connectors which are either individual or grouped into modules or module assemblies (also referred to as "cassettes"). Such module assemblies or cassettes typically have a front interface with one or more first optical connectors (e.g. plug connectors), and a rear interface with one or more second optical connectors (e.g. plug connectors). Often, the number of first connectors of the input-side interface is greater than the number of second connectors of the output-side interface, with the individual connections within the module assembly being distributed accordingly between the two interfaces.

For the assembly of the individual module assemblies on a common carrier unit, two concepts in particular are known from the prior art.

One option is what is referred to as front frame based systems, in which the carrier unit has a front mounting frame, which has recesses for the respective module assemblies, and also punched holes for securing the outer housing of the module assembly. Such a concept is naturally associated with a long mounting time, since a multiplicity of manual screwing or riveting operations are required for fastening the individual module assemblies in the mounting frame. The substantial disadvantage of front frame based systems can be seen, however, in the limited accessibility and/or mountability, since the carrier units in such a system can usually only be fitted with module assemblies on one side, i.e. in particular exclusively from the front and not alternatively also from the rear.

Rail-based systems are an alternative. For this purpose, the carrier unit has individual rail guides and latching points for the module assemblies. As an example, reference should be made to EP 2 995 981 A2, in which various types of rail guides are proposed. Owing to the flexible extensibility of the individual module assemblies, a rail-based system does indeed afford advantages over an immovable, front frame based fastening in terms of the mounting and use of the carrier arrangement, but at the same time requires an elaborate and complex design of the carrier unit and the module assemblies.

In view of the known prior art, it is the object of the present invention to provide a module assembly for the fibre-optic distribution industry, with an alternative mounting option, which is preferably technically easy to realize and convenient for the engineer, in a slot in a corresponding carrier unit.

The present invention is also based on the object of providing a carrier unit for the fibre-optic distribution industry, with an alternative mounting option, which is preferably technically easy to realize and convenient for the engineer, for a corresponding module assembly in a slot in the carrier unit.

It is also an object of the invention to provide a carrier arrangement consisting of a carrier unit and at least one module assembly, with an alternative mounting option, which is preferably technically easy to realize and convenient for the engineer, for the module assembly in a slot in the carrier unit.

The object is achieved for the module assembly and for the carrier unit and for the carrier arrangement by the features disclosed herein, including the features disclosed in the Claims.

A module assembly for the fibre-optic distribution industry, which can be mounted along a mounting direction in a slot in a separate carrier unit, is provided.

The module assembly has a centre region through which a central axis or centre axis oriented in the mounting direction runs. The module assembly also has two side regions, each of which is connected to the centre region opposite each another relative to the centre axis and each of which has at least one side wall.

The centre region runs preferably symmetrically in relation to its centre axis. The centre region can be, for example, an imaginary, rectangular region of the module assembly, which (with respect to the centre axis) merges on both sides in one piece or optionally also in a plurality of pieces into the side regions. The design of the module assembly, i.e. the centre region and the two side regions, can be formed overall symmetrically along the centre axis. However, it can also be provided that only the (imaginary) centre region runs symmetrically and the side regions introduce an asymmetry (in relation to the centre axis) into the module assembly. Preferably, the side walls are arranged symmetrically about the centre axis or are arranged equidistantly from the centre axis.

The centre axis is preferably a longitudinal axis of the module assembly.

It is provided that at least one of the side walls has, at least in certain sections along the centre axis, a curvy and/or stepped (in particular multi-step) profile changing the lateral distance from the centre axis such that the at least one side wall forms at least one protrusion or setback portion for form-fitting mounting in the slot in the carrier unit.

Thus, at least one curvy and/or multi-step protrusion or setback portion can be formed on the side walls along the centre axis, optionally also a plurality of protrusions and/or setback portions. The protrusions or setback portions can be formed, for example, by convex or concave profiles of the side walls. Complex profiles of the side walls are also possible, for example if the curve profile of the side wall has a plurality of vertices or a plurality of radii.

It can be provided in particular that at least one of the side walls along at least one of its directions of extent at least substantially follows an imaginary curved curve, the amplitude of which influences the distance of the corresponding side wall from the respective other side wall or from the centre axis.

Owing to the fact that the side walls of the module assembly are not cuboidal or linear, but for example follow an elliptical or other non-rectilinear profile, the module assembly can be suitable for a technically easily realizable, form-fitting fastening in a corresponding slot in a corresponding connection partner. The proposed design of the module assembly in its side regions can permit a particularly simple, rapid and convenient mounting option for the module assembly in a carrier unit. Complicated rail systems can be dispensed with.

In an advantageous embodiment of the invention, it can be provided that the side walls have a substantially flat profile, preferably in each case being formed in one piece.

The side walls preferably have a flat outer circumferential surface. For example, the side walls of the module assembly can have a convexly arched outer circumferential surface. However, a concavely arched outer circumferential surface, or other curve profiles, can also be provided.

A flat profile of the side walls can be technically particularly easy to realize. In particular, webs, shoulders, longitudinal grooves, etc., which may usually be required, for example, for a rail guide, can be dispensed with.

The side walls preferably extend in each case substantially in two directions of extent. The first direction of extent is preferably a longitudinal extent (in particular in the mounting direction) and the second direction of extent is preferably a transverse extent oriented perpendicularly to the longitudinal extent or orthogonally to the longitudinal extent or mounting direction, in particular the shorter of the two transverse extents, i.e., for example, corresponding to the overall height of the module assembly.

It can be provided that the side wall forms the distance-changing profile—in relation to the centre axis—along the first direction of extent, i.e. along the mounting direction.

It can alternatively or additionally also be provided that the side wall forms the distance-changing profile—in relation to the centre axis—along the second direction of extent, i.e. transversely with respect to the mounting direction.

In a particularly advantageous development of the invention, however, it can be provided that the lateral distance from the centre axis of the at least one side wall along the mounting direction and also transversely with respect to the mounting direction changes (i.e. along the above-mentioned first direction of extent and the second direction of extent).

For example, it can be provided that the side walls of the module assembly are each shaped convexly in the mounting direction and also transversely with respect to the mounting direction (along the overall height) and a corresponding slot in a connection partner (in particular in a carrier unit also described below) is shaped in complementary fashion, i.e. is shaped concavely in two corresponding directions of extent, and therefore the module assembly can be mounted in a form-fitting manner in the slot.

Preferably, the two side walls of the module assembly follow a respectively imaginary curved curve or have the above-mentioned curvy and/or multi-step profile. In the context of the invention, however, it may also be sufficient in certain cases if only one of the side walls has the curvy and/or multi-step profile.

Insofar as both side walls have a respective curvy or multi-step profile, the side walls preferably extend symmetrically with respect to the centre axis of the centre region such that the profile of the respective side wall is mirrored at the centre axis.

According to one embodiment of the invention, it can be provided that the side wall follows the curved curve approximately uniformly, in stepped form, in particular in multi-step form, or polygonally.

Preferably, the profile of the side wall corresponds to the profile of the imaginary curved curve. However, the profile of the side wall may also deviate from the profile of the imaginary, curved curve, for example if the side wall has a multi-step profile. In this case, the side wall has as many points of contact and/or intersecting points as possible with the imaginary curved curve. For example, at least two intersecting points or points of contact, preferably at least four, furthermore preferably at least six, for example even eight, ten or even more points of contact may be provided, with it also being possible to provide an odd number of points of contact, i.e., for example, three, five, seven, nine or even more points of contact.

Any desired curvy, stepped and/or polygonal cross-sectional profile of the side walls can be provided.

According to a development of the invention, it can be provided that the at least one protrusion or setback portion is formed in a central portion spaced apart from the end portions of the side walls.

The end portions between which the side walls extend in each case are preferably respective ends of the module assembly, but optionally also a respective portion in the region of the corresponding end.

In particular, it can be provided that the at least one protrusion or setback portion or the vertex or saddle point also mentioned below is formed centrally or at least substantially centrally between the two end portions, i.e., for example, at least in the central third of the side wall.

In a particularly advantageous embodiment of the invention, it can be provided that the protrusion or setback portion (in particular precisely one protrusion or setback portion) extends over the entire side wall, i.e. in particular over the complete extent of the side wall between the two ends or end portions. This can result, for example, in a bulbous/elliptically arched side wall (convexly or concavely).

According to a development of the invention, it can be provided that the at least one side wall for changing the lateral distance along the centre axis has a continuous profile.

A profile of the side wall interrupted along the centre axis can optionally also be provided. For example, a plurality of side wall segments, which together form the side wall and respective curvy and/or multi-step profiles in certain sections, can be provided.

In one embodiment, the protrusion or setback portion can be formed by at least one vertex or saddle point of the curvy profile, preferably by a primary vertex of a global extremity of the curvy profile of the side wall.

In a development of the invention, it can be provided that the at least one side wall forms an elliptical profile, preferably a concave or convex profile, in a direction orthogonal to the mounting direction.

Therefore, in particular, a profile of the side walls with precisely one vertex or saddle point can be provided, in particular with a preferably central vertex or saddle point spaced apart from the end portions of the side walls, in order to form the protrusion or setback portion.

In a development of the invention, it can be provided that at least one of the side regions is elastic. For example, the side walls can be elastic (for example, using an elastomer as the base material for the side wall) or can have one or more elastic elements.

The deformability or the elasticity in the side regions can be selected such that a sufficient holding force is provided for the module assembly in a corresponding slot in a connection partner and/or that the side regions can bend sufficiently reversibly during the mounting without undergoing (irreversible) plastic deformation.

The overall height of the side walls of the module assembly can preferably be configured to a known standard dimension for fibre-optic module assemblies (what is referred to as a "rack unit", RU). The overall height of the side walls may however be arbitrary in principle. Insofar as a "rack unit" is referred to above and below, this is a unit of measurement which is typically used for electronic housings and which is familiar to a person skilled in the art and is standardized, and which is used in particular with regard to device housings for installation in 19-inch racks or 19-inch distribution frames. One rack unit corresponds to approximately PA inches or approximately 44.45 millimetres.

The module assembly, in particular the side walls of the module assembly, can be formed from a plastic or a metal material. Combinations of plastic or metal can optionally also be provided. Optionally, biocompatible materials, for example biopolymers, can also be provided. In particular, fire-retardant materials can also be used.

The module assembly can have an outer housing, wherein the side walls preferably form a part of the outer housing. The outer housing of the module assembly can be designed in the manner of a frame, in particular can be completely closed along its circumference. The outer housing can optionally, however, also be open on one or more sides. The two side walls can preferably be connected to each other at their respective ends via a front and/or rear end panel. However, it can also be provided that the outer housing only has a base plate and the two side walls, which are only optionally, but not necessarily, connected to each other.

The module assembly preferably has at least one fibre-optic component or at least provides the option of receiving a fibre-optic component. In particular, the centre region can receive at least one fibre-optic component.

The outer housing of the module assembly can have a base plate and/or a cover plate to adequately protect the fibre-optic components of the module assembly.

The module assembly can also be referred to as a "fibre-optic module" or "fibre-optic cassette". Typically, such module assemblies are provided for receiving in a carrier unit, with it being possible for a plurality of module assemblies to be mounted in a common carrier unit.

The module assembly can have a front interface with one or more optical connectors (e.g. plug connectors).

The module assembly can have a rear interface with one or more second optical connectors (e.g. plug connectors).

The number of first connectors of the front interface is preferably greater than the number of second connectors of the rear interface. Within the module assembly, especially within the outer housing, individual connections can be distributed between the two interfaces.

The invention also relates to a carrier unit for at least one module assembly for the fibre-optic distribution industry (in particular the aforementioned module assembly), having a carrier plate, which has at least one slot for at least one module assembly each, and having in each case a centre axis oriented in a mounting direction of the module assembly.

The carrier unit in each case has a fastening device connected to the carrier plate for the form-fitting fastening of the module assembly in the at least one slot. The fastening device has two fastening brackets, which are each formed at a lateral end of the slot relative to the centre axis. Each of the fastening brackets in each case has a side wall, preferably laterally delimiting the slot.

It should be mentioned at this juncture that, within the scope of the present description, the side wall or the side walls of the carrier unit may also be referred to as "carrier side walls" and the side walls of the module assembly as "module side walls". In principle, features of the carrier side walls and of the module side walls can be interchangeable, unless otherwise mentioned and if this is not technically excluded. This applies, for example, to the distance-changing curves with respect to the centre axis (e.g. convex vs. concave), as described above and below, the elasticity of the side walls or the material of the side walls. Insofar as only one "side wall" is mentioned above and below, the details may refer to a module side wall and/or to a carrier side wall.

According to the invention, it is provided that at least one of the side walls of the carrier unit has, at least in certain sections along the centre axis, a curvy and/or multi-step profile changing the lateral distance from the centre axis such that the at least one side wall forms at least one protrusion or setback portion for form-fitting mounting of the module assembly in the slot.

The slot is preferably formed between the carrier side walls, the side walls being oriented horizontally with respect to the carrier plate in order to form a respective horizontal slot delimited by the carrier plate at the bottom (preferably). The centre axis of the slot can thus run parallel to the carrier plate or its main surface.

In principle, however, it can also be provided that the slot is oriented vertically with respect to the carrier plate or runs obliquely, along any desired angle with respect to the carrier plate, in order to enable the module assemblies to be accommodated orthogonally in the direction of the carrier plate or obliquely in the direction of the carrier plate. The centre axis of the slot can thus run in angular to orthogonal form to the carrier plate or its main surface (e.g. at an angle of up to about 5°, 10°, 15°, 20°, 25°, 30°, 35°, 40', 45', 50°, 55°, 60°, 65°, 70°, 75°, 80°, 85°, 90° or more).

It should be mentioned at this juncture that the cover plate and/or base plate can optionally also have spring elements, i.e. can form a part of the slot in the carrier unit. In this case, the cover plate and/or base plate can also be understood as meaning "side walls" within the scope of the present description.

The carrier unit preferably has at least one fibre-optic component or provides at least the possibility of receiving a fibre-optic component.

The carrier unit is preferably used for receiving a plurality of module assemblies, for example for receiving two, three, four, five, six, seven, eight, nine, ten or even more module assemblies.

The carrier unit can be designed, for example, as a tray of a distribution frame or generally as a "patch panel". Optionally, the carrier unit, especially if it is designed as a tray, can have a mounting frame, which optionally has components of a rail guide on the outer sides. In addition to the carrier plate, the carrier unit can optionally also have a cover plate in order to sufficiently protect the module assemblies received in the carrier unit.

Openings for the passage of fibre-optic lines can preferably be formed in the carrier plate of the carrier unit. It can also be provided that the carrier unit is open at the rear and/or front in order to permit advantageous accessibility to the front interface and/or rear interface of the module assemblies. Optionally, a front and/or rear cover plate or end panel can be provided, for example, a closable (e.g. pivotable) cover plate to optionally restrict accessibility to the front and/or rear interface of the module assemblies fastened on the carrier unit.

In an advantageous development of the invention, it can be provided that the carrier plate has a plurality of slots arranged next to one another, preferably at an equidistant spacing and/or with an identical slot width in each case.

As an alternative to an equidistant arrangement of the slots on the carrier plate, any desired irregular or flexible spacing and respective slot width of the slots can be provided. It can also be provided that the slot width of the slots and/or the spacing of individual slots can be adjusted as required, for example by individual carrier side walls on the carrier plate being offset. In this way, different types of fibre-optic module assemblies can be combined modularly on a common carrier unit. The multiple slots can thus be designed for accommodating module assemblies of different widths in each case or can be arranged on the carrier unit.

It can preferably be provided that in each case two directly adjacent slots have a common side wall. Alternatively, however, the adjacent slots can also be formed separately from one other, with each slot therefore having its own side walls.

In a development of the invention, it can be provided that the slot is designed to allow a mounting of the module assembly in the horizontal direction along the carrier plate.

The insertion or the removal of a module can preferably be carried out from the front and back of a slot in the same way.

Alternatively or—preferably—additionally, it can be provided that the slot is designed to allow mounting of the module assembly in the vertical direction, in the direction of the carrier plate.

Preferably, the side walls of the carrier unit enclose the side walls of the module assembly both in top view and in frontal view, and therefore securing of the module assembly can take place both in the mounting direction and in a vertical direction orthogonally oriented thereto.

For mounting the module assembly in the horizontal direction, i.e. along the carrier plate, the slot or the slot-forming carrier unit can preferably be open at at least one, in particular at both end portions. Preferably, the slot comprises only the two side walls. This allows the module assembly to be inserted at the front and/or rear. Insertion on one side (for example, only from the front or only from the rear) can also be provided, for example, if the slot is U-shaped.

In order to allow insertion in the vertical direction, i.e. in the direction of the carrier plate, it can be provided that the slot is open on the side facing away from the carrier plate. In this way, the module assembly can be inserted "from above" into the slot.

Preferably, the module assemblies are secured in a form-fitting manner not only horizontally, but also vertically to the mounting direction. In particular (but not exclusively) in this case, a cover plate of the carrier unit can be dispensed with, which can be of advantage for a particularly dense, stacked arrangement of carrier units, since the possibility of saving on the individual cover plates favours minimizing the overall height of individual carrier units.

In an advantageous development of the invention, it can be provided that at least one of the fastening brackets is elastic.

Preferably, at least one of the fastening brackets has at least one spring element extending along the corresponding side wall or is formed elastically at least in certain sections (for example, using an elastomer as the base material). Particularly preferably, the side wall is formed by at least one leaf spring or has at least one leaf spring.

The spring element preferably acts elastically in the direction of the respective opposite side wall.

The mounting and/or removal of the module assembly into or out of the corresponding slot in the carrier unit can be carried out by overcoming the holding force of the spring elements or leaf springs by a correspondingly strong compressive or tensile force being applied.

The inclusion of an elastic component in the fastening bracket may be advantageous to provide an advantageous possibility for inserting the module assembly and to optionally also apply a force-fitting connection between the slot and module assembly or at least a retaining force to the module assembly in the fastened state. It may in principle already be sufficient if either the side regions of the module assembly or the fastening brackets of the carrier unit are elastic. Optionally, however, it is also possible for both connection partners or neither of the connection partners to be elastic or have a spring element.

A particular advantage in terms of mounting when an elastic component is included in the fastening bracket can also be seen in the fact that the module assembly can then also be introduced into the slot in angular or oblique form. The centring of the module assembly within the slot can be carried out automatically by the spring forces as it is being introduced. An engineer therefore does not have to take particular care and the risk of damage to the module assembly or the carrier unit can also be reduced. Furthermore, an introduction aid, such as a funnel-shaped housing design, can optionally be dispensed with, which can enable a more compact construction.

In a development of the invention, it can be provided that the spring element, in particular the leaf spring, is composed of a plurality of individual springs arranged along the side wall.

The fastening bracket, for example, the respective side wall of the slot, can thus also be formed by a plurality of individual spring elements, which are arranged vertically and/or horizontally next to one other, optionally spaced apart from one another.

The contact pressure with which the fastening brackets of the slot act on the side walls of the module assembly can preferably be optimized in dependence on the application, by a person skilled in the art. The realizable spring force of the spring elements or the spring travel of the individual spring elements can thus be variable, for example by selecting the leaf spring material, the leaf spring thickness and/or the leaf spring length.

In order, in addition to a form-fitting fastening option, optionally also to permit the possibility of an increased frictional connection between the interconnected connection partners, the outer surface of the side walls can optionally have a corresponding surface structure, for example a corrugation or coating.

The slot can be completely closed along its circumference, or optionally, however, can also be open on one or more sides. The slot can therefore be U-shaped, for example. However, it can be provided in particular that the slot has only the two side walls, which are optionally, but not necessarily, connected to each other.

In an advantageous development of the invention, it can be provided that the fastening device is either formed integrally with the carrier plate (e.g. as a punched and bent part or injection-moulded part) or is fastened to the carrier plate (in a force-fitting, form-fitting and/or integrally bonded manner).

Insofar as the slot, in particular the side walls of the slot, for example the spring elements, are intended to be formed integrally with the carrier plate, the carrier plate, optionally the entire carrier unit, can preferably be produced as an injection-moulded part or punched and bent part.

Insofar as the slot or the side walls of the slot are formed in multiple pieces with the carrier plate, these can be fastenable, for example, via pins, rivets or screws. A press fit or an integrally bonded connection, such as a welded connection, can also be provided.

Preferably, the side walls of the slots can be individually latched, pressed and/or screwed onto the carrier plate. The carrier plate can in particular have a connecting grid such that the side walls can be mounted at defined positions by an engineer.

In particular if a plurality of slots are arranged on a common carrier unit, they can also have different overall heights in order to receive fibre-optic module assemblies of different heights.

It should be mentioned at this juncture that a slot in the carrier unit can also be designed for receiving a plurality of fibre-optic module assemblies (in the horizontal direction or in the longitudinal axis direction, i.e. "one behind another" or as a stack, i.e. "one on top of another"). In this case, at least one separate spring element is preferably provided for each module assembly. Preferably, however, a respective slot is provided for receiving precisely one module assembly.

The invention also relates to a carrier arrangement, comprising a carrier unit according to the statements above or below, and at least one module assembly, which is mounted in one of the slots, in particular according to the statements above and below.

In the proposed manner, a fibre-optic module assembly can be releasably secured and centred on a carrier unit (for example, on a tray or fibre-optic distribution housing).

Overall, the module assembly or its outer housing is preferably designed such that it has a curved, in particular elliptical, preferably convex, shape in both frontal view and top view. In each case opposite elastic side walls of respective slots are preferably located on the carrier plate of the fibre-optic carrier unit, preferably in a discrete arrangement, with in particular two leaf spring pairs being provided per slot. The slots preferably correspond in their shape to the negative of corresponding side walls of the module assembly.

In a particularly preferred variant, the leaf springs of the slot, which are pretensioned in the direction of the inside of the slots, can be pushed aside by the curved shape of the module assembly—which preferably tapers in the direction of the front side and rear side—until the vertex of the elliptical module basic outline is located in the centre of the leaf spring pairs. At this point, the leaf springs embrace in a form-fitting manner around the side walls of the module assembly and secure the module assembly by means of a contact pressure defined by the pretensioning of the leaf springs.

In particular, the proposed combination of form-fitting connection and force-fitting connection makes it possible to dispense with an elaborate guide, such as a rail guide, for mounting a module assembly on the carrier unit. Advantageously, a pure clamping function can be provided between the carrier unit and the module assembly.

The insertion and removal of the individual fibre-optic module assemblies can be carried out simply, in particular conveniently and with a saving on time, and also reliably. In a minimalistic variant of the invention, preferably no additional components besides the respective curved side walls are necessary for the purpose of securing or fastening a module assembly in the carrier unit. In particular, it is possible to dispense with a complex rail guide or with screwing the module assembly into the carrier unit.

In an advantageous development of the invention, it can be provided that the side walls of the module assembly have at least substantially a complementary shape of the side wall of the respectively assigned fastening bracket such that the module assembly in its mounted state is accommodated in a form-fitting manner within the fastening device.

In particular, the slot can have a negative shape of the module assembly—or vice versa. In particular, however, a completely complementary shape is not important—a substantially complementary shape between the slot and the module assembly may possibly already be sufficient to provide a stable, form-fitting mounting option.

In particular, it can be provided that the curve of the side walls of the module assembly runs convexly and the curve of the side walls of the slot runs concavely. A convex shape of the module assembly and a concave design of the slot can be technically particularly easy to implement. If necessary, however, the module assembly may also be concave and the slot in the carrier unit may be convex.

In the case of convex side walls, the global extremity of the primary vertex is preferably a global maximum, but, in the case of concave side walls, it is preferably a global minimum of the curve.

Preferably, an at least approximately elliptical or fully elliptical profile of the side walls is provided.

In a development of the invention it can be provided that either the side region of the module assembly or the fastening bracket, which is assigned to the side region, of the fastening device is elastic.

In particular, it is therefore not absolutely necessary for the side walls of the module assembly and the fastening bracket to be elastic in each case.

According to a development of the invention, it can be provided that the module assembly has a latching means and the fastening device of the carrier unit has a mating latching means in order to releasably latch the module assembly in at least one insertion position within the fastening device.

The latching means and mating latching means can be in particular a combination of a depression and an elevation. The depression can be a groove or a setback portion. The elevation can be, for example, a pin, bolt or web. Preferably, the latching means and/or mating latching means can be arranged on a spring-elastic element, such as a latching lever.

In principle, the module assembly and slot can also have a plurality of latching means and respective mating latching means to allow releasable latching in a plurality of insertion positions.

Preferably, latching is provided at least in the fully inserted or mounted position of the module assembly within the slot, but optionally also in one or more partially inserted intermediate positions.

In a particularly advantageous embodiment of the latching connection, it can be provided that the latching means of the module assembly and the mating latching means of the carrier unit are formed in each case at least substantially centrally between the two end portions, for example at the global vertex or saddle point of the side walls. It can be advantageous to provide only a minimum spring travel in the region of the latching connection in order to arrange the latching connection in as rigid a region as possible, since then the required locking force and unlocking force can be configured independently of the spring force and the spring travel.

Optionally, between the module assembly and slot or carrier unit, an end stop for the module assembly can be provided so that the module assembly cannot be pushed further into the slot beyond a certain position, i.e., for example, it also cannot be pushed out again from the rear of the slot.

By means of a specific adjustment of the side walls of the module assembly and of the slot, in particular by adjusting the spring elements, an automatic retraction mechanism can optionally also be provided. This means that the module assembly can also be automatically pulled into the fastening position in the slot.

Features which have been described in conjunction with one of the subjects of the invention, which are specifically the module assembly, the carrier unit and the carrier arrangement, can also be advantageously applied to the other subjects of the invention. Likewise, advantages specified in conjunction with one of the subjects of the invention can also be understood in relation to the other subjects of the invention.

In addition, it should be noted that expressions such as "comprising", "having" or "with" do not exclude any other features or steps. Furthermore, expressions such as "a" or "the" that refer in the singular to steps or features do not exclude a plurality of features or steps—and vice versa.

Note that terms such as "first" or "second" etc. are used predominantly for the sake of distinguishability between respective device or method features, and are not imperatively intended to indicate that features are mutually dependent or relate to one another.

It is furthermore emphasised that the values and parameters described in the present case also encompass deviations and fluctuations of ±10% or less, preferably ±5% or less, more preferably ±1% or less, and very particularly preferably ±0.1% or less, of the respectively stated value or parameter, if such deviations are not ruled out in practice in the implementation of the invention. The specification of ranges by way of start and end values also encompasses all values and fractions encompassed by the respectively stated range, in particular the start and end values and a respective mean value.

The invention also relates to a fastening frame for a module assembly or for a carrier unit for the fibre-optic distribution industry, with two end portions and two side walls extending between the two end portions on opposite sides. At least one of the side walls at least substantially follows, along at least one of its directions of extent, an imaginary curved curve, the amplitude of which influences the distance of the corresponding side wall from the respective other side wall, wherein a vertex or saddle point of an extremity of the curved curve, preferably a more primary vertex of a global extremity, is formed between said end portions of the fastening frame.

The side walls preferably have a substantially flat profile.

The direction of extent along which the side wall follows the curved curve can be a longitudinal extent of the side walls between the two end portions of the fastening frame and/or an extent in the direction of an overall height of the fastening frame.

It can be provided that the side wall follows the curved curve uniformly or in multi-step form.

The (primary) vertex can be substantially centred between the two end portions.

The side wall can be formed by at least one spring element acting elastically in the direction of the respective opposite side wall, preferably by at least one leaf spring.

In addition, a module assembly can be provided within the scope of the present invention, said module assembly comprising an outer housing and an above-described module-side fastening frame, wherein the module-side fastening frame can be mounted in a slot in a carrier unit for the module assembly, and wherein the module-side fastening frame is fastened to the outer housing or formed integrally with the outer housing.

A carrier unit can also be provided, said carrier unit comprising a carrier plate and at least one above-described carrier-side fastening frame, wherein the carrier-side fastening frame forms a slot for mounting the at least one module assembly, and wherein the carrier-side fastening frame is fastened to the carrier plate or is formed integrally with the carrier plate.

A carrier arrangement can be provided, said carrier arrangement comprising the above-described independent carrier unit and at least one above-described independent module assembly mounted in one of the slots.

The applicant reserves the right to claim separately the above-described fastening frame, the independent module assembly, the independent carrier unit and the independent carrier arrangement. The features of the present independent claims, the dependent claims and the features described in the present description relate to advantageous embodiments and variants of the fastening frame and of the independent module assembly, carrier unit and carrier arrangement.

Exemplary embodiments of the invention will be described in detail hereinbelow with reference to the drawings.

SUMMARY

Our invention generally provides a module assembly and a carrier unit, and a carrier arrangement for fiber-optic distribution.

A principal aspect of the present invention is a module assembly (1) for the fibre-optic distribution industry, which can be mounted along a mounting direction in a slot (11) in a separate carrier unit (2), with a centre region (M) through which a centre axis (A) oriented in the mounting direction (x) runs, and two side regions (5), each of which is connected to the centre region (M) opposite each another relative to the centre axis (A) and each of which has a side wall (20.1), characterized in that at least one of the side walls (20.1) has, at least in certain sections along the centre axis (A), a curvy and/or multi-step profile changing the lateral distance (d) from the centre axis (A) such that the at least one side wall (20.1) forms at least one protrusion or setback portion (23, 24, SP) for form-fitting mounting in the slot (11) in the carrier unit (2).

A further aspect of the present invention is a module assembly (1), characterized in that the at least one protrusion or setback portion (23, 24, SP) is formed in a central portion which is spaced apart from the end portions (19) of the side walls (20.1).

A further aspect of the present invention is a module assembly (1), characterized in that the at least one side wall (20.1) for changing the lateral distance (d) along the centre axis (A) has a continuous profile, wherein the protrusion or setback portion is preferably formed by at least one vertex or saddle point (SP) of the curvy profile.

A further aspect of the present invention is a module assembly (1), characterized in that the at least one side wall (20.1) forms an elliptical profile, preferably a concave or convex profile, in a direction orthogonal to the mounting direction (x).

A further aspect of the present invention is a module assembly (1), characterized in that at least one of the side regions (S) is elastic.

A further aspect of the present invention is a module assembly (1), characterized in that the lateral distance (d) from the centre axis (A) of the at least one side wall (20.1) changes along the mounting direction (x) and also transversely with respect to the mounting direction (x).

A further aspect of the present invention is a carrier unit (2) for the fibre-optic distribution industry, having a carrier plate (14), which has at least one slot (11) for at least one module assembly (1) each, which slot has a centre axis (A) oriented in a mounting direction (x) of the module assembly (1), and having in each case a fastening device (21) connected to the carrier plate (14) for the form-fitting fastening of the module assembly (1) in the at least one slot (11), wherein the fastening device (21) has two fastening brackets (22), which are each formed at a lateral end of the slot (11) relative to the centre axis (A), wherein each fastening bracket (22) in each case has a side wall (20.2) facing into the slot (11), characterized in that at least one of the side walls (20.2) has, at least in certain sections along the centre axis (A), a curvy and/or multi-step profile changing the lateral distance (d) from the centre axis (A) such that the at least one side wall (20.2) forms at least one protrusion or setback portion (23, 24, SP) for form-fitting mounting of the module assembly (1) in the slot (11).

A further aspect of the present invention is a carrier unit (2), characterized in that at least one of the fastening brackets (22) is elastic, preferably having a spring element (25) extending along the corresponding side wall (20.2).

A further aspect of the present invention is a carrier unit (2), characterized in that the spring element (25) is composed of a plurality of individual springs arranged along the side wall (20.2).

A further aspect of the present invention is a carrier unit (2), characterized in that the slot (11) is designed to allow the module assembly (1) to be mounted in the horizontal direction along the carrier plate (14), and additionally also in the vertical direction, towards the carrier plate (14).

A further aspect of the present invention is a carrier unit (2), characterized in that the fastening device (21) is either formed integrally with the carrier plate (14) or fastened to the carrier plate (14).

A further aspect of the present invention is a carrier arrangement (26), comprising a carrier unit (2) and at least one module assembly (1), which is mounted in one of the slots (11).

A further aspect of the present invention is a carrier arrangement (26), characterized in that the side walls (20.1) of the module assembly (1) have at least substantially a complementary shape of the side wall (20.2) of the respectively assigned fastening bracket (22) such that the module assembly (1) in its mounted state is accommodated in a form-fitting manner within the fastening device (21).

A still further aspect of the present invention is a carrier arrangement (26), characterized in that either the side region (S) of the module assembly (1) or the fastening bracket (22), which is assigned to the side region (5), of the fastening device (21) is elastic.

An even still further aspect of the present invention is a carrier arrangement (26), characterized in that the module assembly (1) has a latching means (27) and the fastening device (21) of the carrier unit (2) has a mating latching means (28) in order to releasably latch the module assembly (1) in at least one insertion position within the fastening device (21).

These and other aspects of the present invention are more fully set forth herein.

BRIEF DESCRIPTIONS OF THE FIGURES

The figures each show preferred exemplary embodiments in which individual features of the present invention are illustrated in combination with one another. Features of one exemplary embodiment may also be implemented separately from the other features of the same exemplary embodiment, and may accordingly be readily combined by an expert to form further useful combinations and sub-combinations with features of other exemplary embodiments.

Elements of identical function are denoted by the same reference signs in the figures.

In the figures, in each case schematically:

DETAILED WRITTEN DESCRIPTION OF THE PREFERRED EMBODIMENTS

This disclosure of the invention is submitted in furtherance of the Constitutional purposes of the US Patent Laws "to promote the progress of Science and the useful arts" (Article 1, Section 8).

Figure 1:
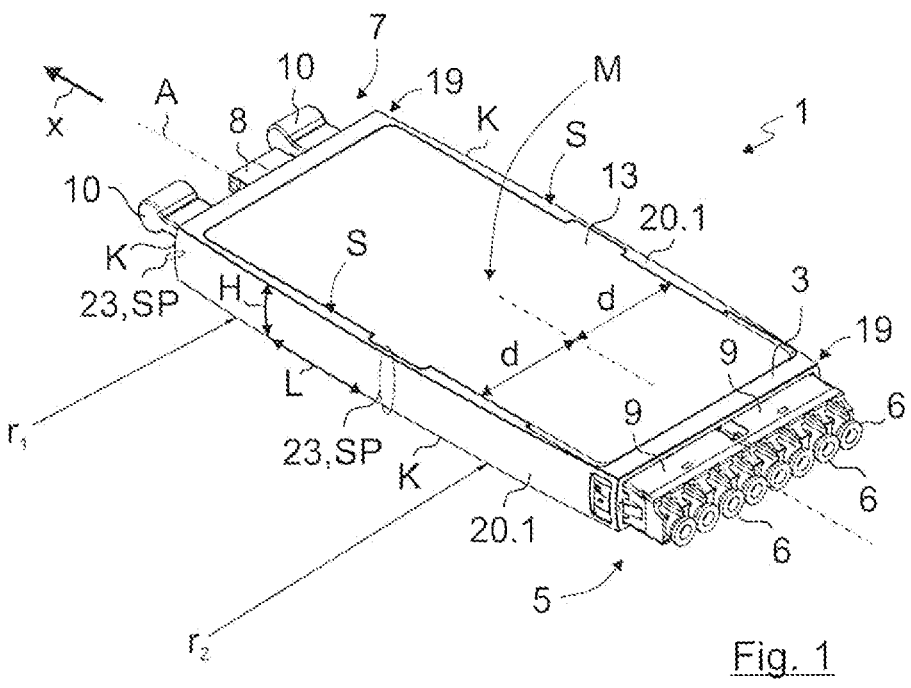
FIG. 1 shows a perspective illustration of a module assembly for mounting in a carrier unit for fibre-optic distribution according to an exemplary embodiment of the invention.
Figure 2:
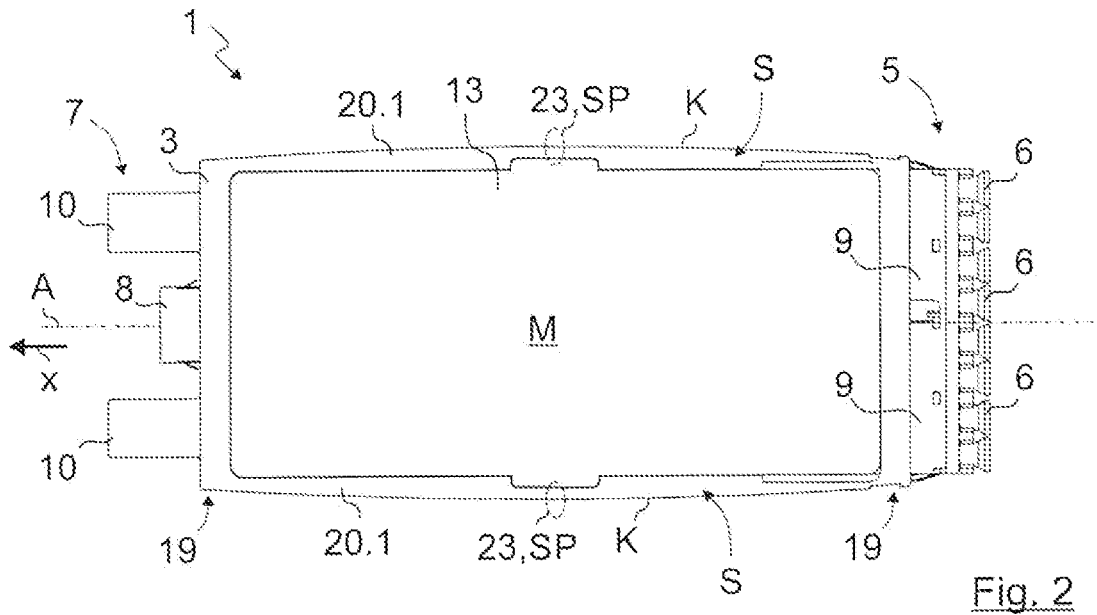
FIG. 2 shows the module assembly of FIG. 1 in a top view.
Figure 3:
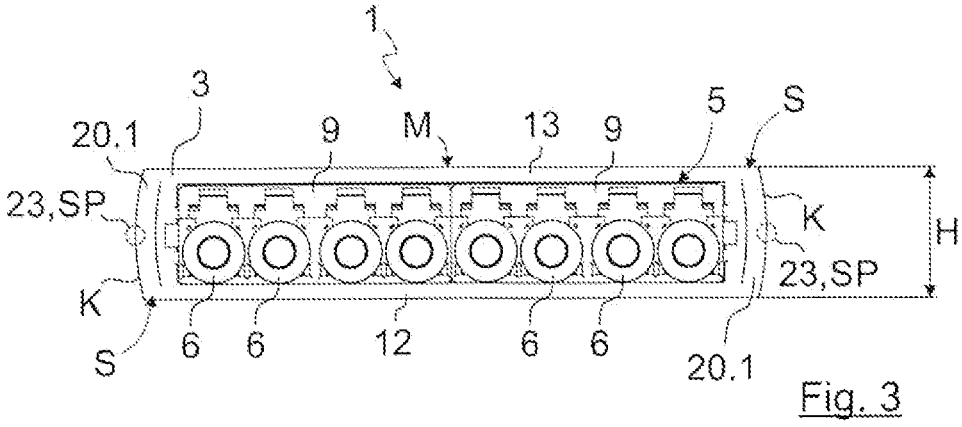
FIG. 3 shows the module assembly of FIG. 1 in a front view of the front interface.

FIGS. 1 to 3 show an exemplary embodiment of a module assembly 1 according to the invention in different views. The module assembly 1 is provided for mounting in a carrier unit 2 for the fibre-optic distribution industry, said carrier unit being shown by way of example in FIGS. 4 to 7. The module assembly 1 has an outer housing 3 for fastening in the carrier unit 2.

The module assembly 1 has a front interface 5 with a plurality of first optical connectors 6 and a rear interface 7 with a second optical connector 8. The first connectors 6 can be grouped individually or within connector modules 9, as shown. Optionally, actuating elements 10 are also arranged on the rear interface 7 to facilitate the handling of the module assembly 1 by the engineer during the mounting.

The outer housing 3 of the module assembly 1 is designed to be able to be mounted in a slot 11 (see, for example, FIGS. 4 and 7) of the carrier unit 2. The outer housing 3 has a base plate 12 and optionally a cover plate 13 to protect the fibre-optic components (not shown) within the module assembly 1.

The carrier unit 2, which is shown by way of example in FIGS. 4 to 7, has a carrier plate 14 and a plurality of slots 11 for the mounting of a plurality of module assemblies 1.

Figure 4:
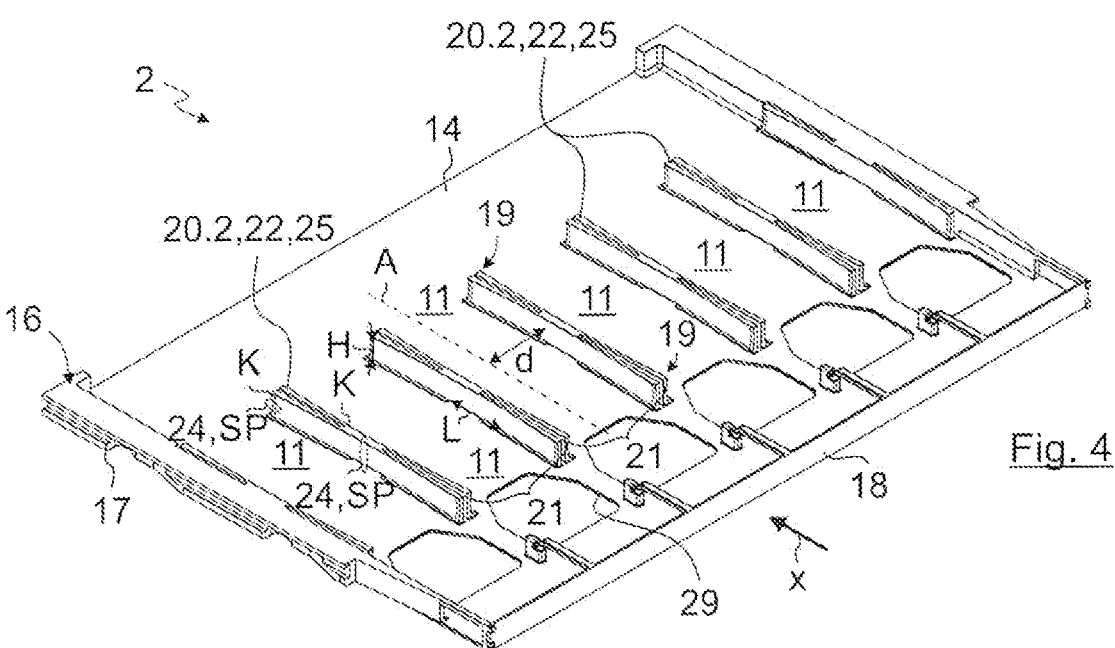
FIG. 4 shows a perspective illustration of a carrier unit for a plurality of module assemblies for fibre-optic distribution, with a plurality of slots according to an exemplary embodiment of the invention.
Figure 5:
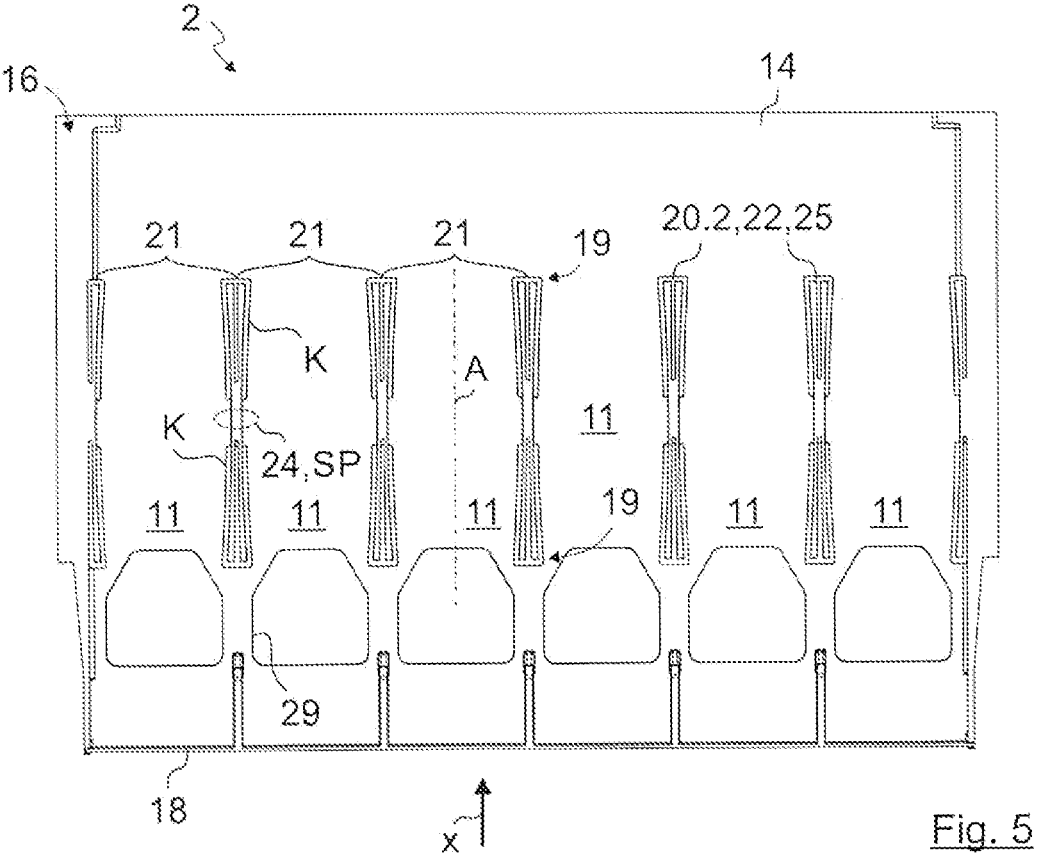
FIG. 5 shows the carrier unit of FIG. 4 in a top view.
Figure 6:
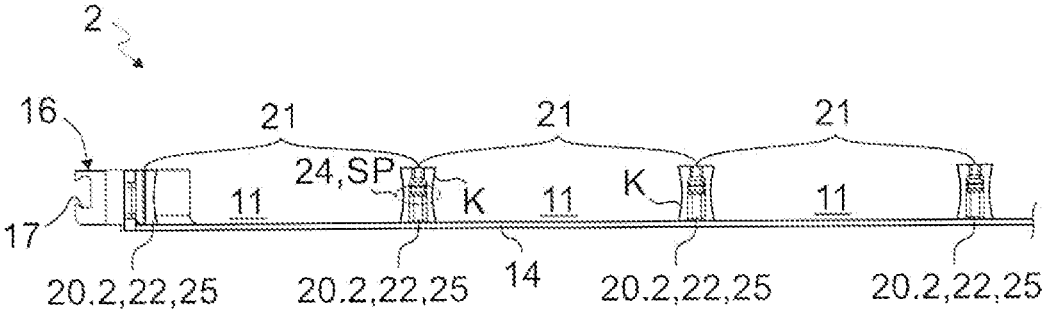
FIG. 6 shows the carrier unit of FIG. 4 in a front view of the front interface.

In the exemplary embodiments, the carrier plate 14 is designed by way of example as a tray and has a mounting frame 16, which comprises a rail guide system 17 on the outer wall. The carrier unit 2 is accessible at the rear and front, with, for example, a covering of the front and/or rear also being able to be provided as required. By way of example, FIG. 4 illustrates a pivotable covering 18 for the front interface of the carrier unit 2.

The outer housing 3 of the module assembly 1 in each case has two end portions 19 and two side walls 20.1 extending on opposite sides between the two end portions 19. The side walls 20.1 of the module assembly 1 are each assigned to a side region S, wherein the side regions S in each case laterally adjoin a centre region M arranged between the two side regions S. The centre region M is preferably used for receiving the fibre-optic components and can in principle be a preferably symmetrical, imaginary central portion of the module assembly 1. A centre axis A oriented in the mounting direction x and preferably being a longitudinal axis of the module assembly 1 runs through the centre region M.

The slots 11 in the carrier unit 2 each have two end portions 19 and two side walls 20.2 extending on opposite sides between the two end portions 19. A centre axis A oriented in the mounting direction x extends through the slot 11. The carrier unit 2 also has in each case a fastening device 21, which is connected to the carrier plate 14, for the form-fitting fastening of the module assembly 1 in the at least one slot 11. The fastening devices 21 each have two fastening brackets 22, to which the side wall 20.2 directed into the slot 11 in each case is assigned.

In the exemplary embodiments, the fastening brackets 22 and the carrier-side side walls 20.2 are formed in each case in multiple parts with the carrier plate 14 and fastened, for example latched, to the carrier plate 14. In principle, however, a one-piece variant can also be provided.

At least one of the side walls 20.1, 20.2, in the exemplary embodiments both side walls 20.1, 20.2, has/have, at least in certain sections along the centre axis A, a curvy and/or multi-step profile changing the lateral distance d from the centre axis A such that the at least one side wall 20.1, 20.2 forms at least one protrusion 23 or setback portion 24 for a form-fitting mounting.

Figures 8, 9:
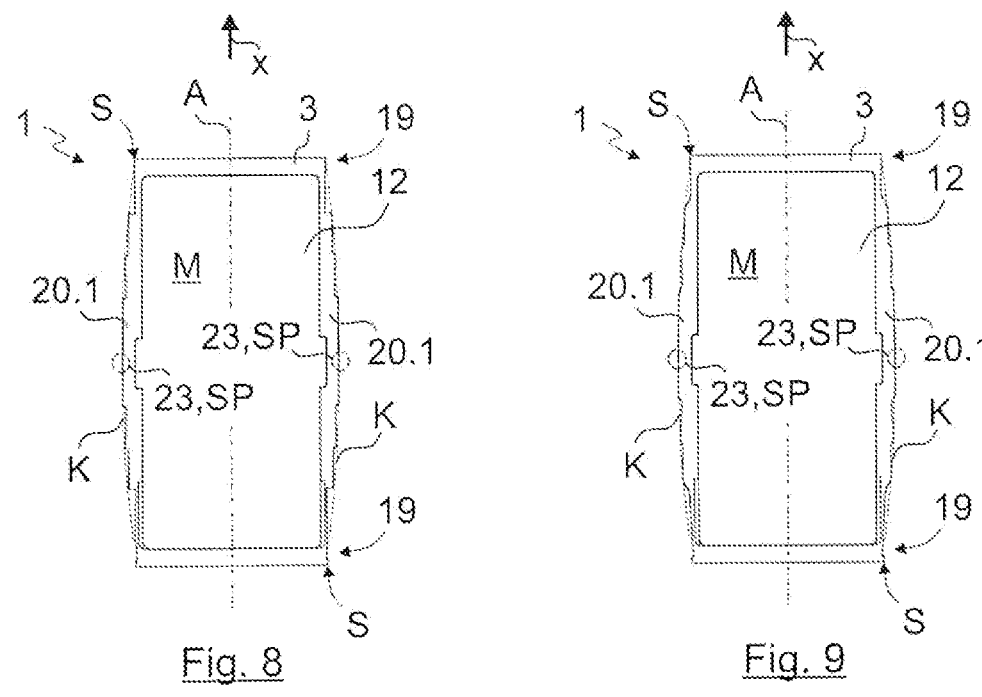
FIG. 8 shows an outer housing of a module assembly according to a further exemplary embodiment of the invention, with a multi-step profile of the side walls, in a top view.
FIG. 9 shows an outer housing of a module assembly according to a further exemplary embodiment of the invention, having a polygonal, wavy curve profile of the side walls, in a top view.

The side walls 20.1, 20.2 therefore preferably at least substantially follow, along at least one direction of extent L, H (cf. FIGS. 1 and 4), an imaginary, curve K (cf., for example, FIG. 8). The amplitude of the curve K in each case influences the distance d (cf. FIGS. 1 and 4) of the corresponding side wall 20.1, 20.2 from the centre axis A. A primary vertex SP of a global extremity of the curve K can be formed between the end portions 19 of the side walls 20.1, 20.2.

Even though, in the exemplary embodiment of FIGS. 1 to 7, the primary vertex SP or the global extremity of the curve K is substantially centred between the two end portions 19, this is not necessarily required. In principle, any desired curve profile of the side walls 20.1, 20.2 can be provided, in particular even a profile with a plurality of local extremities or with a plurality of radii $r_{1,2}$. For example, different $radii_{1,2}$ are also provided for the formation of the profile of the side walls 20.1, 20.2 according to the exemplary embodiment of FIGS. 1 to 7 (cf. FIG. 1).

In the exemplary embodiments, the side walls 20.1, 20.2 have a substantially flat profile. In the exemplary embodiments, the directions of extent, along which the side wall 20.1, 20.2 follows the curve K, are a longitudinal extent L of the side walls 20.1, 20.2 between the two end portions 19 and an extent in the direction of an overall height H of the module assembly 1 (cf. in particular FIG. 3).

The fastening brackets 22 and/or the side walls 20.2 of the carrier unit 2 (cf. FIGS. 4 to 7) have respective elastically acting spring elements 25, in particular leaf springs. In principle, the side walls 20.1 of the module assembly 1 can also be designed as spring elements 25 (cf. FIG. 12). The preferred variant, in which only the carrier unit 2 has spring elements 25, is shown in FIGS. 1 to 11.

The slots 11 are arranged on the carrier plate 14 of the carrier unit 2 at equidistant spacing and each with the same slot width, wherein two directly adjacent slots 11 each have a common side wall 20.2—which, however, does not necessarily have to be the case.

The slots 11 in the carrier unit 2 are each designed to allow mounting of the module assembly 1 in the horizontal direction along the carrier plate 14 (i.e. from the front and/or from the rear) and also to allow mounting in the vertical direction in the direction of the carrier plate 14 (i.e. from above). The slots 11 in the carrier unit 2 therefore each comprise only the side walls 20.2, the side walls 20.2 not being connected to one other at the end portions 19, and also a cover plate is not provided on the side facing away from the carrier plate 14.

Figure 7:
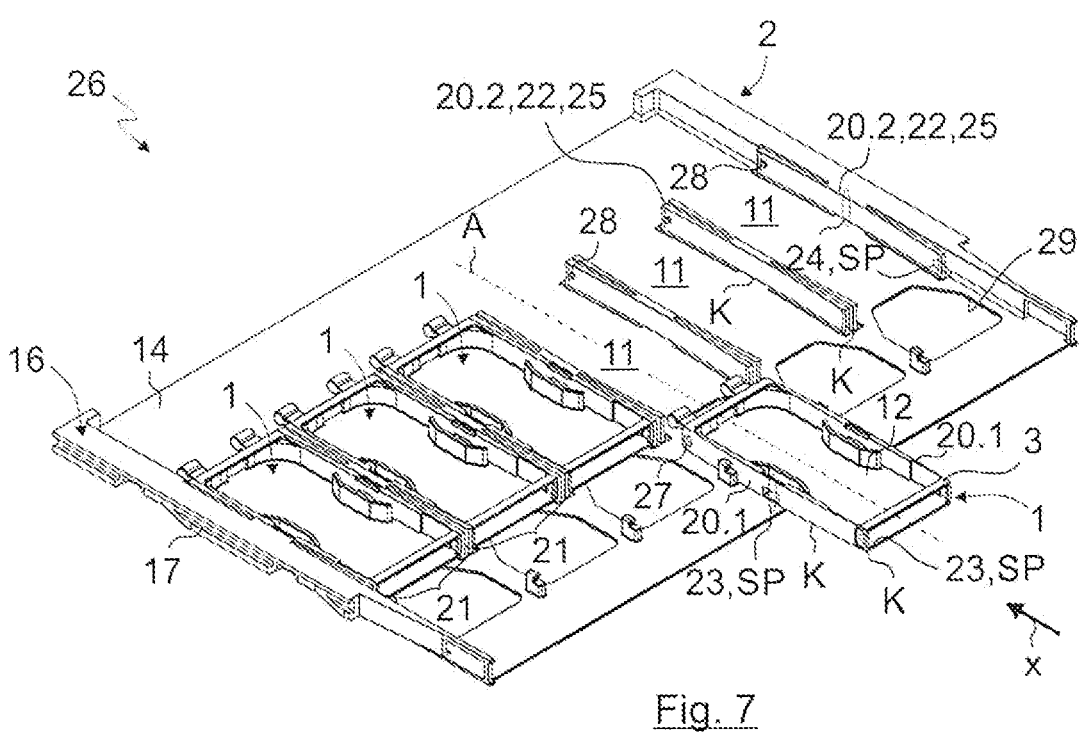
FIG. 7 shows a perspective illustration of a carrier arrangement consisting of a carrier unit and a plurality of module assemblies.

A carrier arrangement 26 consisting of a carrier unit 2 and a plurality of module assemblies 1 is indicated by way of example in FIG. 7, wherein for simplification only the respective outer housing 3 of the module assembly 1 is shown. Also in subsequent FIGS. 8 to 12, the outer housing 3 is shown for easier representation in each case without the other components of the module assembly 1.

The side walls 20.1 of the module assembly 1 have at least substantially a complementary shape of the side walls 20.2 and of the fastening brackets 22 of the carrier unit 2 such that, in its mounted state, the outer housing 3 of the module assembly 1 is received in a form-fitting manner within the slot 11. FIG. 7 illustrates by way of example three module assemblies 1 mounted in a form-fitting manner in the carrier unit 2.

Optionally, it can be provided that the module assembly 1 has a latching means 27 and the carrier unit 2 a mating latching means 28 in order to releasably latch the module assembly 1 within the slot 11 in at least one insertion position (e.g. in the fully inserted position). In the exemplary embodiment shown in FIG. 7, the latching means 27 is designed as a recess within the side walls 20.1 of the module assembly 1 and the mating latching means 28 as a latching lug of the side walls 20.2 and/or spring elements 25 of the carrier unit 2. Optionally, a plurality of latching means 27 and/or mating latching means 28 can also be provided in order optionally to releasably secure the module assembly 1 in a plurality of pull-out or insertion positions within the carrier unit 2. In a preferred variant, latching means 27 and mating latching means 28 are each arranged at least substantially centrally between the two end portions 19, for example at the vertex SP of the respective imaginary curve K.

In the carrier plate 14 of the carrier unit 2, openings 29 can preferably be formed directly in front of and/or behind the slots 11. By way of example, in the region of the front interface of the carrier unit 2, openings 29 assigned to the respective slots 11 are formed in the carrier plate 14. Corresponding openings 29 can also be arranged in principle, however, in the rear region of the carrier unit 2. The module assemblies 1 can be easier for an engineer to mount and remove through the openings 29. For example, a module assembly 1 mounted in a slot 11 can be gripped well with one hand because of the opening 29, in order then to be pulled out of the slot 11 with sufficient force counter to the spring forces and/or an optional latching.

In the carrier plate 14 of the carrier unit 2, additional recesses or openings or channels (not shown) can optionally also be formed for the passage of fibre-optic lines (for example, in the region of the front interface of the carrier unit 2 and/or in the rear region of the carrier unit 2).

With reference to FIGS. 8 to 12, some examples of possible geometries of the outer housing 3 of the module assembly 1—and thus also of the slots 11 corresponding to corresponding carrier units 2—are to be demonstrated.

In the exemplary embodiment of FIGS. 1 to 7, the side wall 20.1 has a continuous, curved profile or uniformly follows an imaginary, curve K. However, as shown in FIG. 8, it may also be provided that the side wall 20.1 of the module assembly 1 has a multi-step profile, that is, follows the curve K step by step, wherein preferably an as large a correspondence as possible between the profile of the side wall 20.1 and the imaginary, curve K is provided, i.e. in particular as many points of contact and/or intersecting points as possible.

The side wall 20.1 can have any desired stepped or polygonal shape. For example, the wavy portions can also be provided for approximation to the imaginary curve K, as shown in FIG. 9.

Figure 10:
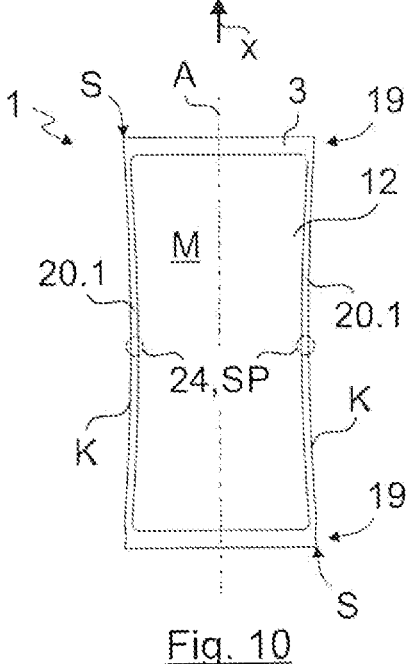
FIG. 10 shows an outer housing of a module assembly according to a further exemplary embodiment of the invention, with a concave profile of the side walls, in a top view.

In a preferred variant, the outer housing 3 of the module assembly 1 runs convexly and the slots 11 in the carrier unit 2 run concavely, as shown in the exemplary embodiment of FIGS. 1 to 7. Alternatively, however, it can also be provided that the outer housing 3 of the module assembly 1 runs convexly and the slot 11 in the carrier unit 2 runs concavely, as shown in FIG. 10.

Figure 11:
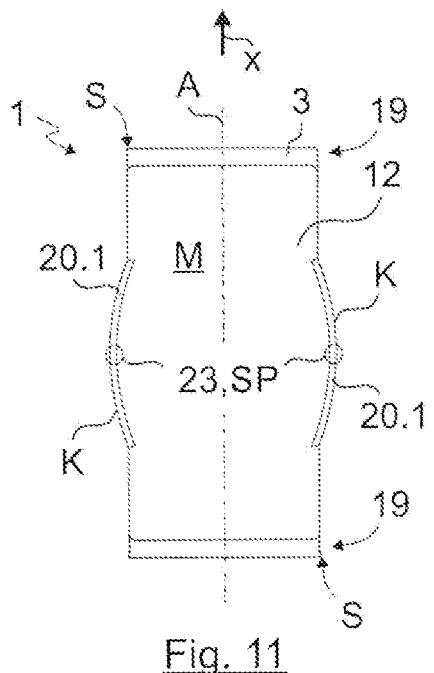
FIG. 11 shows an outer housing of a module assembly according to a further exemplary embodiment of the invention, with a central arrangement of side wall segments, in a top view.

Furthermore, the side walls 20.1 of the module assembly 1 according to FIGS. 1 to 7 extend completely between the two ends of the module assembly 1, but in principle only an extent in certain sections between the end portions 19 may also be sufficient, i.e. also a profile spaced apart from the ends, as shown in FIG. 11. The side walls 20.1 of the module assembly 1 of FIG. 11 therefore do not extend to the respective ends and are arranged in a central portion along the centre axis A on the base plate 12 of the outer housing 3 of the module assembly 1.

It should be mentioned at this juncture that the side walls 20.1 of the module assembly 1 can in principle also be segmented or formed in multiple parts. Thus, in particular along the centre axis A, a plurality of interrupted and optionally also spaced-apart side wall segments can be provided, which overall in turn form a common "side wall" 20.1, which has the intended curvy and/or multi-step profile. In the same way, the side walls 20.2 of the slot 11 in the carrier unit 2 can also be interrupted, in particular also if the side walls 20.2 of the carrier unit 2 are designed as spring elements 25 or have spring elements 25. In particular, in this case, a plurality of spring elements 25 can be arranged offset along the centre axis A.

Figure 12:
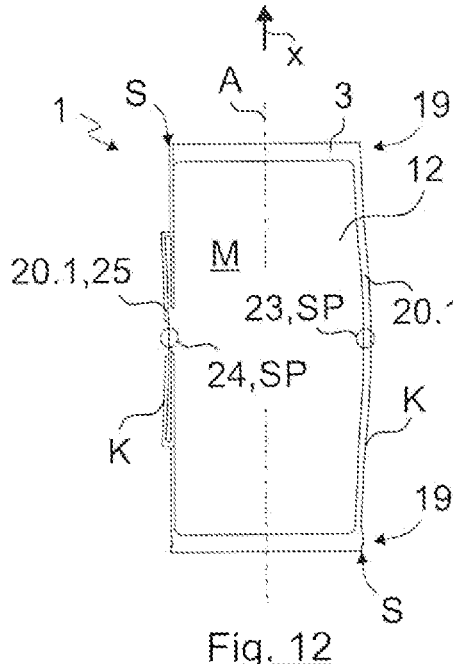
FIG. 12 shows an outer housing of a module assembly according to a further exemplary embodiment of the invention, with differently designed side walls, wherein one of the side walls has an elastic spring element, in a top view.

With reference to the exemplary embodiment of FIG. 12, it should finally also be clarified that the profile of the two side walls 20.1 of a common module assembly 1 does not have to correspond or be formed running mirror-symmetrically to the centre axis A. FIG. 12 shows by way of example an outer housing 3, in which one of the side walls 20.1 is formed from a concave spring element 25 and the other side wall 20.1 from a convex wall. The module assembly 1 can therefore be inserted, for example, into a slot 11, which has a concave setback portion 24 on one side of the centre axis A (in the mounting direction x on the right side), preferably with a spring element 25, and on the opposite side of the centre axis A, a convex protrusion 23, preferably without a spring element 25. The elastic components for the force-fitting connection can thus also be divided between slot 11 and outer housing 3 of the module assembly 1.

Figure 13:
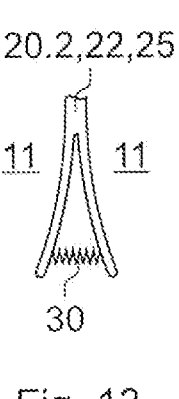
FIG. 13 shows a fastening bracket arranged between two slots in a carrier unit with an additional spring element for increasing the spring force.

FIG. 13 shows a variant of the invention in which the spring force of the spring elements 25 of a fastening bracket 22 of a carrier unit 2 has been increased. The fastening bracket 22 shown is arranged between two slots 11 and has a spring element 25 used by both slots 11. On one or both end portions of the spring element 25, an additional spring element 30 can optionally be provided for increasing the spring force in the direction of the centre axis A. The additional spring element 30 can be, for example, a coil spring.

Operation

Having described the structure of our Module Assembly, Carrier Unit and Carrier Arrangement for the Fiber-Optic Distribution Industry, its operation is briefly described.

A principal object of the present invention is a module assembly (1) for fibre-optic distribution, the module assembly (1) comprising: a centre region (M) through which a centre axis (A) that is oriented in a mounting direction (x) runs; and two side regions (5), and each of the two side regions (S) is arranged/positioned opposite the other relative to the centre axis (A) and each of the two side regions (5) has a side wall (20.1), and at least one of the side walls (20.1) has, at least in certain sections along the centre axis (A), a curvy and/or multi-step profile that changes the at least one side walls' (20.1) lateral distance (d) from the centre axis (A) such that the at least one side wall (20.1) forms at least one protrusion and/or setback portion (23, 24, SP) for form-fitting mounting in a slot (11) defined in a carrier unit (2); and wherein at least one of the side walls (20.1) along at least one of the side walls' (20.1) directions of extent (L, H) substantially follows an imaginary curved curve (K), and the imaginary curve (K) defines an amplitude; and wherein the amplitude of the imaginary curve (K) influences distance (d) of the corresponding at least one side wall (20.1) from the centre axis (A); and wherein the at least one side wall (20.1) has at least four intersecting points/points of contact with the imaginary curved curve (K); and wherein the at least one protrusion and/or setback portion (23, 24, SP) is formed in a central portion of the at least one sidewall (20.1) and is spaced apart from end portions (19) of the at least one side wall (20.1).

A further object of the present invention is a module assembly (1) wherein the at least one side wall (20.1) that changes the lateral distance (d) along the centre axis (A) has a continuous profile, and wherein the protrusion and/or setback portion is formed by at least one vertex or saddle point (SP) of the curvy or multi-step profile.

A further object of the present invention is a module assembly (1) wherein the at least one side wall (20.1) forms an elliptical profile, preferably a concave or convex profile, in a direction orthogonal to the mounting direction (x).

A further object of the present invention is a module assembly (1) wherein at least one of the two side regions (5) is elastic.

A further object of the present invention is a module assembly (1) wherein the lateral distance (d) from the centre axis (A) to at least one side wall (20.1) changes along the mounting direction (x) and also changes transversely with respect to the mounting direction (x).

A further object of the present invention is a carrier unit (2) for at least one module assembly (1) for fibre-optic distribution, the carrier unit (2) comprising: a carrier plate (14), which defines at least one slot (11) for the at least one module assembly (1); and the at least one slot (11) defined in the carrier plate (14) has a centre axis (A), and the centre axis (A) is oriented in a mounting direction (x) of the at least one module assembly (1); and a fastening device (21) connected to the carrier plate (14) for form-fitting fastening of the at least one module assembly (1) in the at least one slot (11); and wherein the fastening device (21) has two fastening brackets (22), which are each formed at a lateral end of the at least one slot (11) relative to the centre axis (A), and wherein each of the two fastening brackets (22) has a side wall (20.2) that is oriented toward the at least one slot (11), and wherein at least one of the two fastening brackets (22) is elastic; and wherein at least one of the side walls (20.2) of the two fastening brackets (22) has, along the centre axis (A), a curvy and/or multi-step profile, and the curvy and/or multi-step profile changes a distance (d) of the at least one side wall (20.2) from the centre axis (A) such that the at least one side wall (20.2) forms at least one protrusion and/or setback portion (23, 24, SP) relative to the centre axis (A) for form-fitting mounting of the at least one module assembly (1) in the at least one slot (11); and wherein at least one of the side walls (20.2) along at least one of its directions of extent (L, H) substantially follows an imaginary curve (K), and the imaginary curve (K) defines an amplitude; and the amplitude of the imaginary curved curve (K) influences distance (d) of the corresponding at least one side wall (20.2) from the centre axis (A); and wherein the at least one side wall (20.2) has at least four intersecting points/points of contact with the imaginary curved curve (K); and wherein the at least one protrusion and/or setback portion (23, 24, SP) is formed in a central portion of the at least one side wall (20.2) and is spaced apart from the end portions (19) of the respective at least one side wall (20.2).

A further object of the present invention is a carrier unit (2) wherein at least one of the two fastening brackets (22) has a spring element (25) extending along the corresponding at least one side wall (20.2).

A further object of the present invention is a carrier unit (2) wherein the spring element (25) is composed of a plurality of individual springs arranged along the at least one side wall (20.2).

A further object of the present invention is a carrier unit (2) wherein the at least one slot (11) allows the module assembly (1) to be mounted in a horizontal direction along the carrier plate (14), and also in a vertical direction, along the carrier plate (14).

A further object of the present invention is a carrier unit (2) wherein the fastening device (21) is formed integrally with the carrier plate (14).

A further object of the present invention is a carrier arrangement (26), comprising: a carrier unit (2) having, a carrier plate (14), which defines at least one slot (11) for a module assembly (1); and the at least one slot (11) defined in the carrier plate (14) has a centre axis (A), and the centre axis (A) is oriented in a mounting direction (x) of the module assembly (1), and a fastening device (21) connected to the carrier plate (14) for form-fitting fastening of the module assembly (1) in the at least one slot (11), and wherein the fastening device (21) has two fastening brackets (22), which are each formed at a lateral end of the at least one slot (11) relative to the centre axis (A), and wherein each of the two fastening brackets (22) has a side wall (20.2) that is oriented toward the at least one slot (11), and wherein at least one of the two fastening brackets (22) is elastic, and wherein at least one of the side walls (20.2) of the two fastening brackets (22) has, along the centre axis (A), a curvy and/or multi-step profile, and the curvy and/or multi-step profile changes a distance (d) of the at least one side wall (20.2) from the centre axis (A) such that the at least one side wall (20.2) forms at least one protrusion and/or setback portion (23, 24, SP) relative to the centre axis (A) for form-fitting mounting of the module assembly (1) in the at least one slot (11), and wherein at least one of the side walls (20.2) along at least one of its directions of extent (L, H) substantially follows an imaginary curve (K) which defines an amplitude, and the amplitude of imaginary curve (K) influences distance (d) of the corresponding at least one side wall (20.2) from the centre axis (A), and wherein the at least one side wall (20.2) has at least four intersecting points/points of contact with the imaginary curved curve (K), and wherein the at least one protrusion and/or setback portion (23, 24, SP) is formed in a central portion of the at least one side wall (20.2) and is spaced apart from the end portions (19) of the at least one side wall (20.2); and at least one module assembly (1) for fibre-optic distribution, which is mounted in one of the at least one slot (11); the at least one module assembly (1) having, a centre region (M) through which a centre axis (A) oriented in the mounting direction (x) runs, and two side regions (S), and each of two side regions (5) is connected to the centre region (M), and opposite each another relative to the centre axis (A) and each of the two side regions (S) has a side wall (20.1), and at least one of the side walls (20.1) has, at least in certain sections along the centre axis (A), a curvy and/or multi-step profile changing the at least one side walls' (20.1) lateral distance (d) from the centre axis (A) such that the at least one side wall (20.1) forms at least one protrusion and/or setback portion (23, 24, SP) for form-fitting mounting in the slot (11) defined in the carrier unit (2), and wherein at least one of the side walls (20.1) along at least one of the side walls' (20.1) directions of extent (L, H) at least substantially follows an imaginary curve (K), and the imaginary curve (K) defines an amplitude, and wherein the amplitude of the imaginary curve (K) influences distance (d) of the corresponding at least one side wall (20.1) from the centre axis (A), and wherein the at least one side wall (20.1) has at least four intersecting points/points of contact with the imaginary curve (K), and wherein the at least one protrusion and/or setback portion (23, 24, SP) is formed in a central portion of the at least one sidewall (20.1) and is spaced apart from end portions (19) of the at least one side wall (20.1) and wherein the at least one side wall (20.1) of the module assembly (1) has a complementary shape of the side wall (20.2) of the respectively assigned fastening bracket (22) such that the module assembly (1), in its mounted state is accommodated in a form-fitting manner within the fastening device (21).

A still further object of the present invention is a carrier arrangement (26) wherein the at least one module assembly (1) has a latching means (27) and the fastening device (21) of the carrier unit (2) has a mating latching means (28) in order to releasably latch the at least one module assembly (1) in at least one insertion position within the fastening device (21).

An even still further object of the present invention is a carrier unit (2) wherein the fastening device (21) is fastened to the carrier plate (14).

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. A module assembly (1) for fibre-optic distribution, the module assembly (1) comprising:
    a centre region (M) through which a centre axis (A) that Is oriented in a mounting direction (x) runs; and
    two side regions (S), and each of the two side regions (S) is arranged/positioned opposite the other relative to the centre axis (A) and each of the two side regions (S) has a side wall (20.1), and at least one of the side walls (20.1) has, at least in certain sections along the centre axis (A), a curvy nonlinear profile that changes the at least one side walls' (20.1) lateral distance (d) from the centre axis (A) such that the at least one side wall (20.1) forms at least one protrusion or setback portion (23, 24, SP) for form-fitting mounting along a mounting direction in a slot (11) defined in a carrier unit (2); and
    the slot (11) defined in the carrier unit (2) has a corresponding side profile that engages with the at least one protrusion or setback portion (23, 24, SP) of the module assembly (1) curvy nonlinear profile.

2. A module assembly (1) according to claim 1, characterized in that the at least one side wall (20.1) for changing the lateral distance (d) along the centre axis (A) has a continuous profile, wherein the protrusion or setback portion is preferably formed by at least one vertex or saddle point (SP) of the curvy profile.

3. A module assembly (1) according to claim 1, characterized in that the at least one side wall (20.1) forms an elliptical profile, preferably a concave or convex profile, in a direction orthogonal to the mounting direction (x).

4. A module assembly (1) for fibre-optic distribution, the module assembly (1) comprising:
    a centre region (M) through which a centre axis (A) that is oriented in a mounting direction (x) runs; and
    two side regions (S), and each of the two side regions (S) is arranged/positioned opposite the other relative to the centre axis (A) and each of the two side regions (S) has a side wall (20.1), and at least one of the side walls (20.1) has, at least in certain sections along the centre axis (A), a multi-step profile that changes the at least one side walls' (20.1) lateral distance (d) from the centre axis (A) such that the at least one side wall (20.1) forms at least one protrusion or setback portion (23, 24, SP) for form-fitting mounting in a slot (11) defined in a carrier unit (2); and wherein
    the multi-stepped profile comprises plural individual steps, and each of the plural individual steps is a lateral distance (d) from the centre axis (A) of the module; and wherein
    at least two of the plural individual steps of the multi-stepped profile have different lateral distances (d) to the centre axis (A); and wherein
    the multi-stepped profile approximates a curve that is not linear; and wherein
    the slot (11) defined in the carrier unit (2) has a configuration that corresponds to the side regions (S) of the module assembly (1).

5. A module assembly (1) according to claim 1, characterized in that at least one of the side regions (S) is elastic.

6. A module assembly (1) according claim 1, characterized in that the lateral distance (d) from the centre axis (A) of the at least one side wall (20.1) changes along the mounting direction (x) and also transversely with respect to the mounting direction (x).

7. A carrier unit (2) for at least one module assembly (1) for fibre-optic distribution, the carrier unit (2) comprising:
    a carrier plate (14), which defines at least one slot (11) for the at least one module assembly (1); and
    the at least one slot (11) defined in the carrier plate (14) has a centre axis (A), and the centre axis (A) is oriented in a mounting direction (x) of the at least one module assembly (1); and
    a fastening device (21) connected to the carrier plate (14) for form-fitting fastening of the at least one module assembly (1) in the at least one slot (11); and wherein
    the fastening device (21) has two fastening brackets (22), which are each formed at a lateral end of the at least one slot (11) relative to the centre axis (A), and wherein each of the two fastening brackets (22) has a side wall (20.2) that is oriented toward the at least one slot (11), and wherein at least one of the two fastening brackets (22) Is elastic; and wherein
    at least one of the side walls (20.2) of at least one of the two fastening brackets (22) has, at least in certain sections along the centre axis (A), a curvy nonlinear profile, and the curvy nonlinear profile changes a lateral distance (d) of the at least one side wall (20.2) from the centre axis (A) such that the at least one side wall (20.2) forms at least one protrusion or setback portion (23, 24, SP) relative to the centre axis (A) for form-fitting mounting of the at least one module assembly (1) in the at least one slot (11); and wherein
    the at least one protrusion or setback portion (23, 24, SP) is formed in a central portion of the at least one side wall (20.2) and is spaced apart from the end portions (19) of the respective at least one side wall (20.2); and wherein the at least one protrusion or setback portion (23, 24, SP) corresponds to a side region(S) of the at least one module assembly (1).

8. A carrier unit (2) for at least one module assembly (1) for fibre-optic distribution, the carrier unit (2) comprising:

a carrier plate (14), which defines at least one slot (11) for the at least one module assembly (1); and the at least one slot (11) defined in the carrier plate (14) has a centre axis (A), and the centre axis (A) is oriented in a mounting direction (x) of the at least one module assembly (1); and a fastening device (21) connected to the carrier plate (14) for form-fitting fastening of the at least one module assembly (1) in the at least one slot (11); and wherein the fastening device (21) has two fastening brackets (22), which are each formed at a lateral end of the at least one slot (11) relative to the centre axis (A), and wherein each of the two fastening brackets (22) has a side wall (20.2) that is oriented toward the at least one slot (11), and wherein at least one of the two fastening brackets (22) is elastic; and wherein at least one of the side walls (20.2) of at least one of the two fastening brackets (22) has, at least in certain sections along the centre axis (A), a multi-step profile, and the multi-step profile changes a lateral distance (d) of the at least one side wall (20.2) from the centre axis (A) such that the at least one side wall (20.2) forms at least one protrusion or setback portion (23, 24, SP) relative to the centre axis (A) for form-fitting mounting of the at least one module assembly (1) in the at least one slot (11); and wherein the at least one protrusion or setback portion (23, 24, SP) is formed in a central portion of the at least one side wall (20.2) and is spaced apart from the end portions (19) of the respective at least one side wall (20.2); and wherein the multi-stepped profile comprises plural individual steps, and each of the plural Individual steps is a lateral distance (d) from the centre axis (A); and wherein at least two of the plural individual steps of the multi-stepped profile have different lateral distances (d) to the centre axis (A); and wherein the multi-stepped profile approximates a curve that is not linear; and wherein the at least one protrusion or setback portion (23, 24, SP) corresponds to a side region(S) of the at least one module assembly (1).

9. A carrier unit (2) according to claim 7, characterized in that at least one of the fastening brackets (22) has a spring element (25) extending along the corresponding side wall (20.2).

10. A carrier unit (2) according to claim 9, characterized in that the spring element (25) is composed of a plurality of individual springs arranged along the side wall (20.2).

11. A carrier unit (2) according to claim 7, characterized in that the at least one slot (11) is designed to allow the at least one module assembly (1) to be mounted in the horizontal direction along the carrier plate (14), and additionally also in the vertical direction, towards the carrier plate (14).

12. A carrier unit (2) according to claim 7, characterized in that the fastening device (21) is either formed integrally with the carrier plate (14) or fastened to the carrier plate (14).

13. A carrier arrangement (26), comprising:

a carrier unit (2) having, a carrier plate (14), which defines at least one slot (11) for a module assembly (1); and the at least one slot (11) defined in the carrier plate (14) has a centre axis (A), and the centre axis (A) is oriented in a mounting direction (x) of the module assembly (1), and a fastening device (21) connected to the carrier plate (14) for form-fitting fastening of the module assembly (1) in the at least one slot (11), and wherein the fastening device (21) has two fastening brackets (22), which are each formed at a lateral end of the at least one slot (11) relative to the centre axis (A), and wherein each of the two fastening brackets (22) has a side wall (20.2) that is oriented toward the at least one slot (11), and wherein at least one of the two fastening brackets (22) is elastic, and wherein at least one of the side walls (20.2) of the two fastening brackets (22) has, along the centre axis (A), a curvy nonlinear and/or multi-step profile, and the curvy nonlinear and/or multi-step profile changes a distance (d) of the at least one side wall (20.2) from the centre axis (A) such that the at least one side wall (20.2) forms at least one protrusion and/or setback portion (23, 24, SP) relative to the centre axis (A) for form-fitting mounting of the module assembly (1) in the at least one slot (11), and wherein the at least one protrusion and/or setback portion (23, 24, SP) Is formed in a central portion of the at least one side wall (20.2) and is spaced apart from the end portions (19) of the at least one side wall (20.2); and at least one module assembly (1) for fibre-optic distribution, which is mounted in one of the at least one slot (11);

the at least one module assembly (1) having, a centre region (M) through which a centre axis (A) oriented in the mounting direction (x) runs, and two side regions(S), and each of two side regions(S) is arranged/positioned opposite the other relative to the centre axis (A) and each of the two side regions(S) has a side wall (20.1), and at least one of the side walls (20.1) has, at least in certain sections along the centre axis (A), a curvy nonlinear and/or multi-step profile changing the at least one side walls' (20.1) lateral distance (d) from the centre axis (A) such that the at least one side wall (20.1) forms at least one protrusion and/or setback portion (23, 24, SP) for form-fitting mounting in the slot (11) defined In the carrier unit (2); and wherein the at least one protrusion or setback portion (23, 24, SP) defined in the at least one side wall (20.2) of the respective fastening bracket (22) corresponds to the at least one protrusion or setback portion (23, 24, SP) defined in the at least one side wall (20.1) of the at least one module assembly (1).

14. A carrier arrangement (26) according to claim 13, characterized in that the at least one module assembly (1) has a latching means (27) and the fastening device (21) of the carrier unit (2) has a mating latching means (28) in order to releasably latch the at least one module assembly (1) In at least one insertion position within the fastening device (21).

15. A module assembly (1) for fiber-optic distribution as claimed in claim 1 and wherein the curvy nonlinear profile defines an arcuate curve.

16. A module assembly (1) for fiber-optic distribution as claimed in claim 4 and wherein the multistep profile defines an arcuate curve.

\* \* \* \* \*